United States Patent [19]
Smyrnow

[11] 3,884,810
[45] May 20, 1975

[54] ANTI POLLUTION WATERWAY DEVICE AND PROCESS

[76] Inventor: Wassily Smyrnow, 2813 Arlington Blvd. Apt. 102, Arlington, Va. 22201

[22] Filed: July 13, 1972

[21] Appl. No.: 271,244

[52] U.S. Cl. ............ 210/170; 61/1 R; 210/DIG. 21; 210/242
[51] Int. Cl. .......................................... E02b 15/04
[58] Field of Search ........ 210/65, 170, 242; 61/1 R

[56] References Cited
UNITED STATES PATENTS

| | | | |
|---|---|---|---|
| 3,491,023 | 1/1970 | McCormick | 210/242 X |
| 3,578,171 | 5/1971 | Usher | 210/242 |
| 3,651,646 | 2/1972 | Grunau | 61/1 R |
| 3,683,627 | 8/1972 | Girren | 61/1 R |

*Primary Examiner*—John Adee
*Attorney, Agent, or Firm*—John J. Byrne

[57] ABSTRACT

Equipment and process of use in causing the formation of subsurface and surface typically river water turbulence of a suspended-pollutant-coagulating type of turbulence extending continually along at an angle to and across the direction of flow transversely of flowing water such as that of a river, such that an obliquely angled barrier is formed across the width of the river to make water-suspended pollutants become non-suspended and to rise to the surface and to slide angularly along the obliquely angled barrier on the water's surface in a downstream direction, and collecting the surface pollutants at the downstream end of the barrier, preferably the turbulence being caused by a directing of bubbles or aeration air upwardly from about the waterway bottom and also concurrently directing upwardly in juxtaposition to the bubbles portions of deep flowing water to enhance the pollutant-removing turbulence, the sea-bed equipment being provided in serially-linkable unit lengths easily laid and linked and individual segments being easily replacable in maintenance thereof.

8 Claims, 9 Drawing Figures

ANTI POLLUTION WATERWAY DEVICE AND PROCESS

This invention relates to an anti-pollution device and process for cleansing and purifying polluted streams and rivers.

BACKGROUND TO THE INVENTION

Prior to the present invention there have existed increasingly over recent years new and additional sources of pollution of rivers, including trash in general but also including for example, various foams, organic matter such as garbage, oil, and the like, with the result that increasing numbers of fish have been killed which dead fish further pollute the streams and lower the oxygen level thereof as well as increasing the bacteria thereof. Finally the citizens and government of society have recognized the major proportion of the problem and are at least purportedly encouraging and fostering all promising measures for the improvement and/or correction of these conditions, as well as the prevention of greater deterioration in our natural resources with regard to the natural environment associated with rivers and streams, such as bathing areas, fishing areas, portable drinking-water sources, desirable vegetation, and the suppression of disease, and the like.

Among other difficulties and problems encountered in any effort to control or eliminate pollution from rivers or streams is the necessity of use of the stream for normal river travel such as by boats, ships, barges, or the like which require that there be no surface or subsurface barriers which might interfere with such river travel or be adversely affected or damaged by the river traffic through either physical contact or wave motion or the like. Also, insofar as chemical treatment there is the problem that chemicals cannot be used which would be corrosive to shoreline wharves, boats, ships, or the like, as well as the fact that the chemicals employed cannot be dangerous or corrosive or detrimental to persons that might be swimming or otherwise exposed to the treated water.

Prior to the present invention there have existed patents directed toward the use of air or oxygen for the purpose of aerating and/or forming bubbles moving to the top of the water from beneath the water for one or more purposes in either still water or in water subject to wave action, as the case may be. Typical of such patents for example is Budd et al U.S. Pat. No. 3,470,091, which utilizes a series of a plurality of substantially parallel separate pipes dispersed each in about perpendicular relationship to the flow of the stream, for applying the combination of aeration and flocculation-treatment preferably solely to water where there is a substantial relative absence of turbulence, such as in smaller or non-navigable streams, the patent stating that in the case of larger or navigable streams or rivers, the treating fluid — as opposed to compressed air — should be a liquid having a high oxygen content dissolved therein such as for example 100 parts per million of $O_2$ dissolved in water pre-prepared before introduction through the pipes running perpendicular to the flow of the stream. The Hinde U.S. Pat. No. 3,234,123 is directed to the purification of relatively calm water such as at least slow-moving streams or impoundments behind dams and intakes, utilizing a series of about parallely extending pipes along the lake or pool bottom such that the air coming from the perforations in the plurality of parallel pipes compartmentalizes the body of water causing recirculating flow within each compartmentalized segment of the water volume. The Hoult U.S. Pat. No. 3,593,526 is a patent directed to effecting the same type circulation as that referred to in the Hinde patent, the Hoult patent being directed to a special zig-zag accordion-pleated configuration together with a requisite pressure in order to offset the effect of wave action in maintaining the compartmentalization in order to effectively contain oil slicks in various compartmentalized portions of surface water. Each of U.S. Pat. Nos. 1,391,992 and 843,926 are additionally older patents directed toward offsetting the effect of wave action in order to prevent damaging effects of wave action to a shoreline or the like. Accordingly, none of these patents have any relevant nor significant bearing on the present invention other than superficial similarity in the use of pressurized air beneath the water surface for results entirely distinct and different from that to which the present invention is directed.

SUMMARY OF THE INVENTION

Accordingly, an object of the present invention is to overcome one or more of the above-type difficulties or problems relative to river and stream pollution where there is at least a minor current-flow of water, the present invention not being adapted to bodies of water in which there is no flow of water from one direction toward another direction.

Another object of the present invention is to obtain an apparatus and a process of accomplishing the other objects of the present invention.

Another object is to obtain a simple construction and process of operation.

Another object is to obtain an apparatus of construction and operation such that cost of manufacture and operation is minimal and below that of other available systems.

Another object is to obtain an apparatus for the purposes of other objects in which the apparatus is of a construction adaptable to an easy mode of transportation thereof as well as ease and low cost of installation, replacement, flexibility of arrangement, and the like.

Another object is to obtain an apparatus and process which do not interfere with river or stream navigation nor with water sports and which effect the primary purpose of the present invention to both aerate the water and to effect an efficient direction of polluted material to a collection area and to make possible and effect the removal of pollutants from the river water.

Another object is to obtain an apparatus and a process of operation resulting in an increased barrier to both subsurface and surface downstream flow of pollutants of either or both solid objects and less-solid materials such as scums, suspended particles, oil slicks, and the like.

Another object is to improve the water composition in favor of fish, water sports, and the like, as well as improved health conditions.

Another object is to obtain a state of less pollution of shores and beaches.

Another object is to obtain an apparatus and a process of operation operable effectively in any variety of weather conditions.

Another object is to obtain an apparatus which is such that possible imperfect installation of one or more parts thereof does not significantly alter nor jeopardize the operation effectively of the whole.

Another object is to provide a method of concurrently chemically treating the river water to the extent that might be desired with one or more chemicals.

Other objects become apparent from the preceding and following disclosure.

One or more of the objects are fulfilled by the invention as described herein.

Broadly the invention includes both an apparatus and a process. For example the process includes the cleansing of waterway flowing water by directing a gaseous fluid such as compressed air through a submerged conduit extending along a line of flow at an oblique angle to the direction of the flowing water, releasing the compressed air from the conduit in the form of bubbles all along the extension of the conduit at a plurality of closely arranged points such that an oblique barrier of bubbles is formed obliquely across the direction of flow of water, there being a sufficient amount of bubbles released to form a major up-draft current of water toward the surface and to the surface of the water, the result being that as is known from prior art such as that discussed above currents counter to the normal flow of water are created at least sufficiently to temporarily deter the movement of debris and other pollutants but with the downstream flow of the current causing the pollutants to slide obliquely along the oblique barrier in a downstream direction to a collection point which includes a collection means of any desired or conventional type. The heart of the process lies in the creation of an oblique barrier of turbulence sufficient to deter downstream movement of pollutants at least sufficiently for these pollutants to slide along the oblique barrier obliquely to the collection point. Accordingly, the process may be effected even without the use of compressed air or bubbles — but possibly to some extent less effectively, depending upon the depth of the water — by a process which utilizes a particular preferred apparatus of this invention which directs sub-currents of water upwardly to create the necessary turbulence-barrier extending obliquely to the flow of the water. The inventive apparatus therefor may be either of two type constructions or combination thereof, both of which achieve the same purpose — namely the directing of a substantial current of subsurface water upwardly in the creation of a barrier arrangeable obliquely to the flow of water, together with preferably a collection means at the downstream end of the oblique barrier. In greater particularity, the water cleansing apparatus includes an elongated tube having perforations therein extending for a predetermined length with the perforations being either fixed or variable to desired cross sectional areas for achieving the desired bubble size as dependent upon the magnitude of the current flow and also dependent upon the number of perforations, a mounting means mountable of the tube(s) in an oblique direction relative to the flow of current and preferably spacing the perforated tube a predetermined distance from the bottom stream bed sufficient that sub-surface water is flowable beneath the tube. Basically the remainder of the invention is directed to the preferred embodiment as follows. The preferred angle of obliqueness ranges from about 15° to about 75° relative to a direction of normal flow of the water-way water. Either separate from or in conjunction with the water tube is a physical apparatus or structure which has an upper surface receivable of water about horizontal with the stream bed in its direction of flow but which upon contact with the surface is angled gradually upwardly toward the water surface, preferably adjacent the points of air bubble release. The upward flow of the turbulence is improved by the spacer means spacing the tube away from the bottom such that water flowing beneath the tube by vacuum action of the upwardly flowing bubbles and water directed against the curved surface pulls upwardly some of the subsurface water which passes beneath the tube thereby increasing the magnitude and thickness of the turbulence oblique barrier. Naturally all structural parts are of non-corrosive or corrosion resistant material preferably and the pipes are in short sections preferably separately mountable from the mounting face which also preferably is in short sections for convenience of maneuvering, mounting, repairing, transportation, and the like. Each of the upwardly-angling surface structures and the corresponding supporting base structures preferably include specially designed flushly meshing surfaces in the nature of a Z in which the flow of the current pushes the curved structure into a tighter and more secure mounted relationship with the supporting bottom structure, and such that the mating Z surfaces are additionally bindable to one another to prevent the possibility of slippage thereof, one relative to the other. It is desirable that the plurality of base supports as well as the plurality of conduits and/or curved surface structures for directing the water upwardly are detachably mountable for easy mounting and/or replacement thereof. In addition to the conduit or pipe carrying the compressed air, there may be additional pipes receiving air flow from the main conduit pipe, and having the perforations therein, with the perforations being solely in the second pipe or being both in the first pipe and the second pipe receiving its air flow from the first pipe. Also there may be one or more additional flow pipes running in parallel with the air pipes, for the carrying of one or more chemical water-treating agents as might be desired to be released either upstream or downstream from the release of air, an upstream location being preferred from the standpoint that the agitation achieved in the vicinity of the barrier would improve the distribution of the chemical within the water prior to its flowing downstream. As a part of the apparatus there naturally has to be a means for providing air under pressure in order to force it to depth below the river or stream through the conduits and outwardly through the perforations in the one or more pipes.

Typically as the pollutants are slid by virtue of the water flow current along the oblique barrier of water turbulence, various oil pollutants and other debris are delivered to removal points normally along an adjoining bank. However, the conduits for the present invention need not extend all the way to the bank but may extend merely through a main channel of the stream if desired, and the removal point may be separate from any adjoining bank. The pollutant removal plant may be any of the common graders for delivering the pollutants into collection vessels and/or on to the adjacent bank from whence it can be continually or subsequently removed.

THE FIGURES

Figure 5:
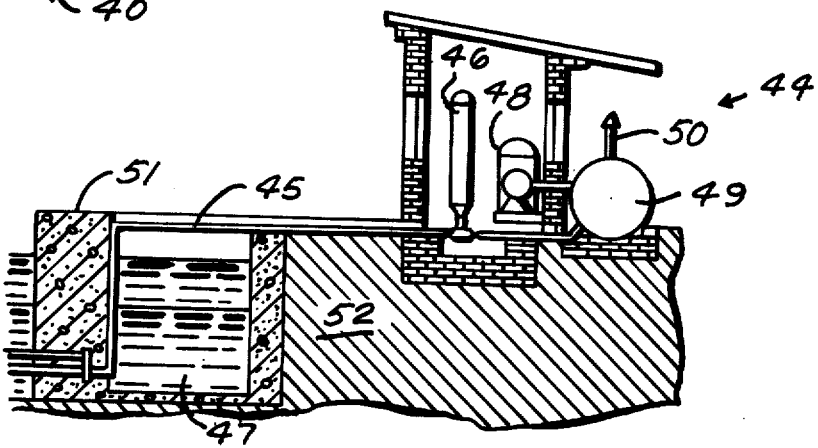
Figure 4:
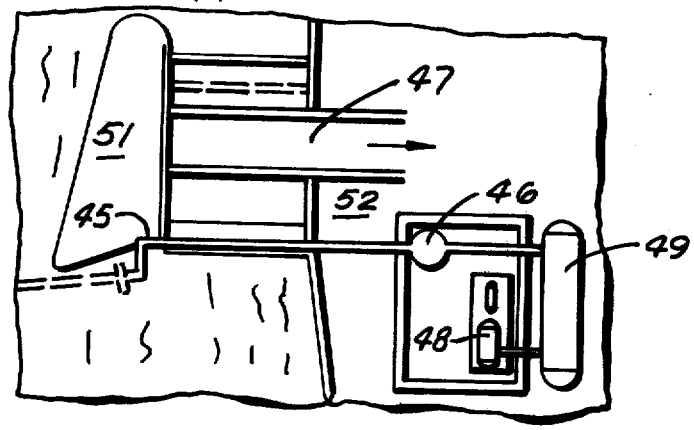
FIG. 4 illustrates an enlarged view of the plant facility in elevation plan view as illustrated in FIG. 2.
Figure 6:
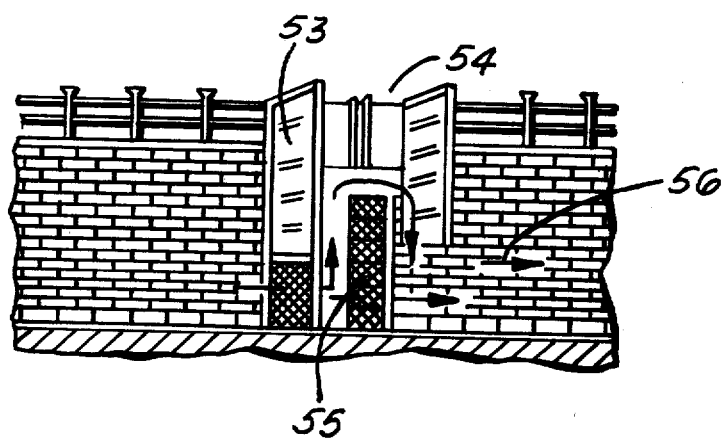

FIGS. 5 and 6 each illustrate in cross sectional side views further details of the plant structure or facility of FIG. 4.

Figure 2:
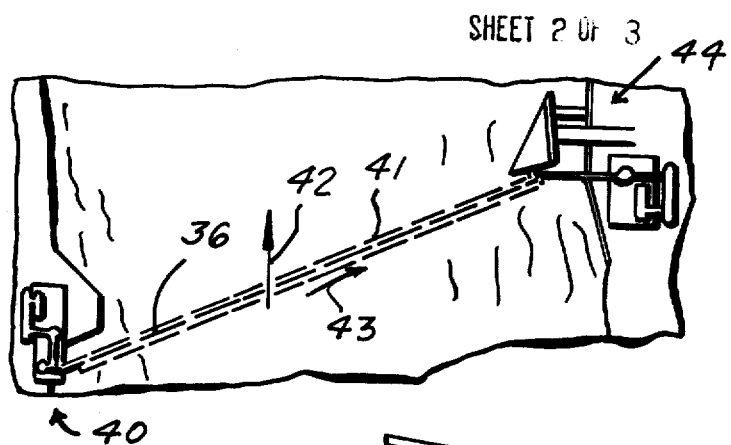
FIG. 2 illustrates an in-part elevation plan view of a river and opposing banks of the river together with structures on each bank connected by the obliquely aligned interconnected series of turbulence producing structures.
Figure 7:
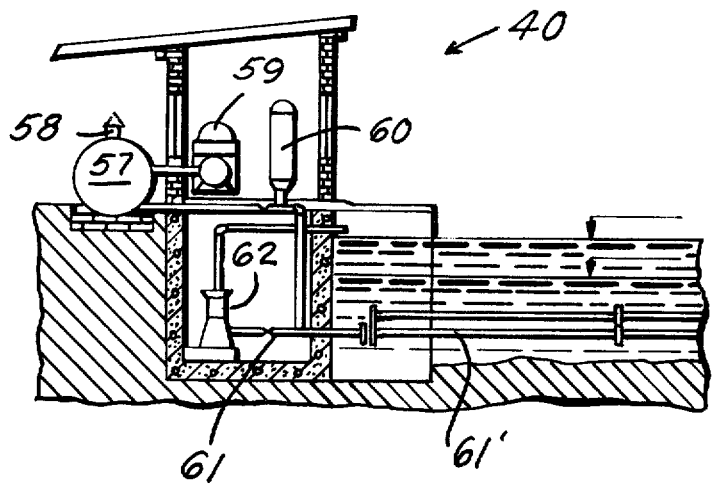

FIG. 7 illustrates in cross sectional side view details of the plant facility of the left bank of FIG. 2.

Figure 8:
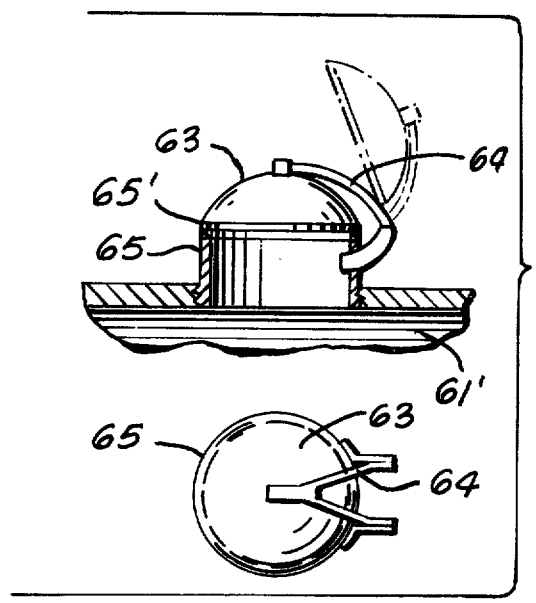

FIG. 8 illustrates in side cross section a typical valve that may be employed for this invention in conjunction with the submerged pipe line, for letting out air at a predetermined measured rate. Also in FIG. 8 there is illustrated the appearance of the valve in the closed state as viewed from the top thereof.

Figure 1:
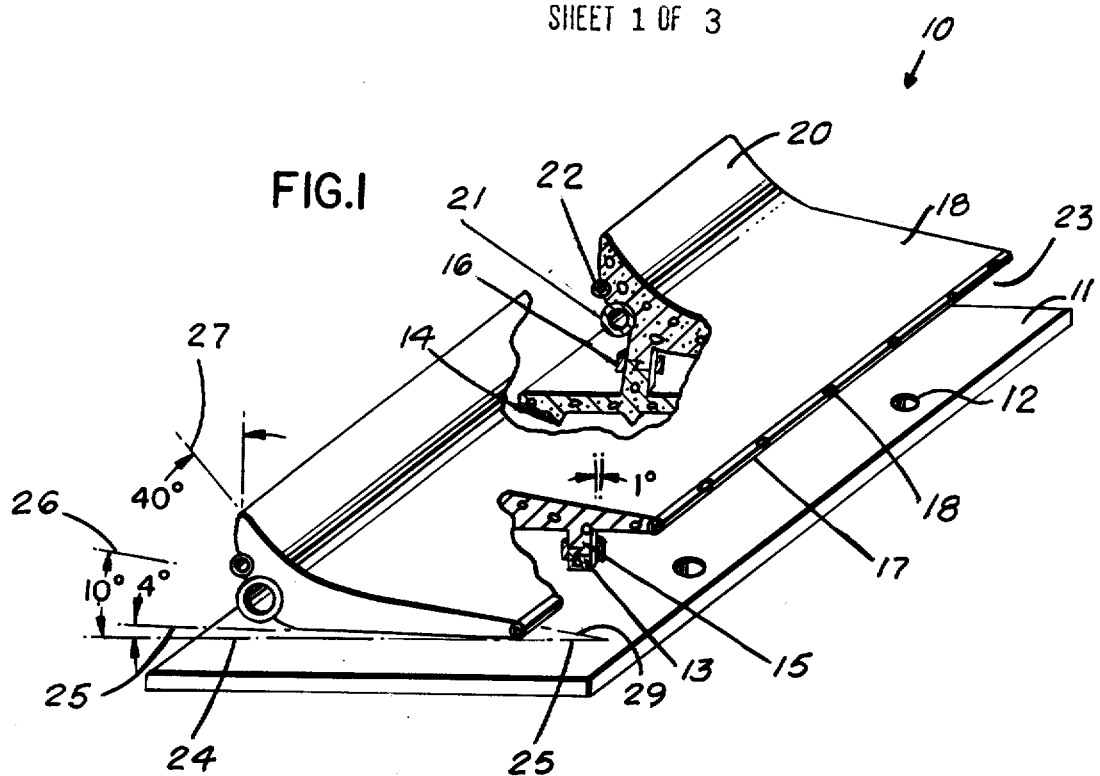
FIG. 1 illustrates a perspective view showing cutaway portions of a preferred embodiment of one section of a water turbulence-creating structure of the present invention.
Figure 9:
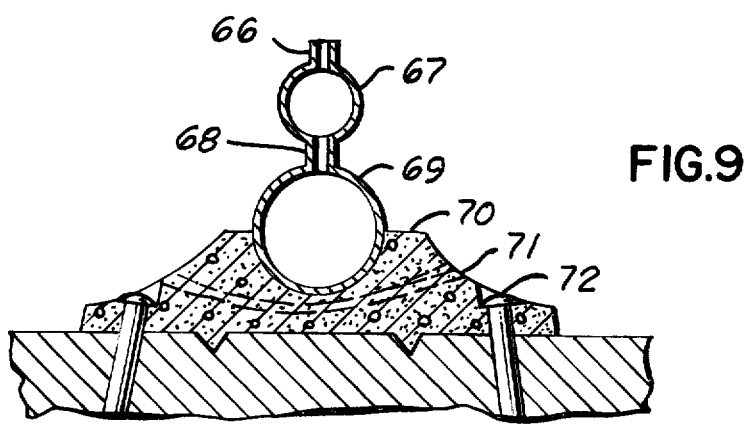

FIG. 9 illustrates an alternate embodiment of the present invention, as contrasted to that of FIG. 1, and is illustrated in cross sectional end view, as looking down the pipes.

DETAILED DESCRIPTION OF THE INVENTION

FIG. 1 illustrates a typical single section 10, of which there would be a series of end to end sections extending across a stream bottom bed diagonally across the stream in an oblique manner between opposing shores. There is included the base 11, the anchor holes 12 therein, the base mounting Z structure 13, the non-shifting projections 14, the downwardly extending Z structure 15, the locking band 16 securing together the Z structures 13 and 15, chemical treatment pipeline 17 and chemical outlet perforations 18 therein, substantially horizontal water guide 19 and the upwardly angled rearward flange 20 thereof, main air-carrying pipe 21 and air distribution pipe 22 for distributing bubbles into the water at predetermined rates and points spaced along the pipe and flow space 23 between the horizontal water guide 19 and the base 11. Line 24 represents a horizontal as extending from flush with the lower side of pipe 17, whereas line 25 extends along the lower face of water guide 19 at a slightly elevated angle of four degrees relative to the horizontal 24. Line 26 represents an imaginary extension of the lineally extending upper surfaces of the wave guide 19 prior to the angling upward of the flange 20, the line 26 being typically at an angle relative to the horizontal 24 of about 9 or 10° preferably. Similarly, the 4° angle is merely a preferred angle. Line 27 relative to line 24 horizontal defines the angle at which the flange 20 is angled upwardly relative to the horizontal, and is preferably about 40° to 45°.

Figure 3:
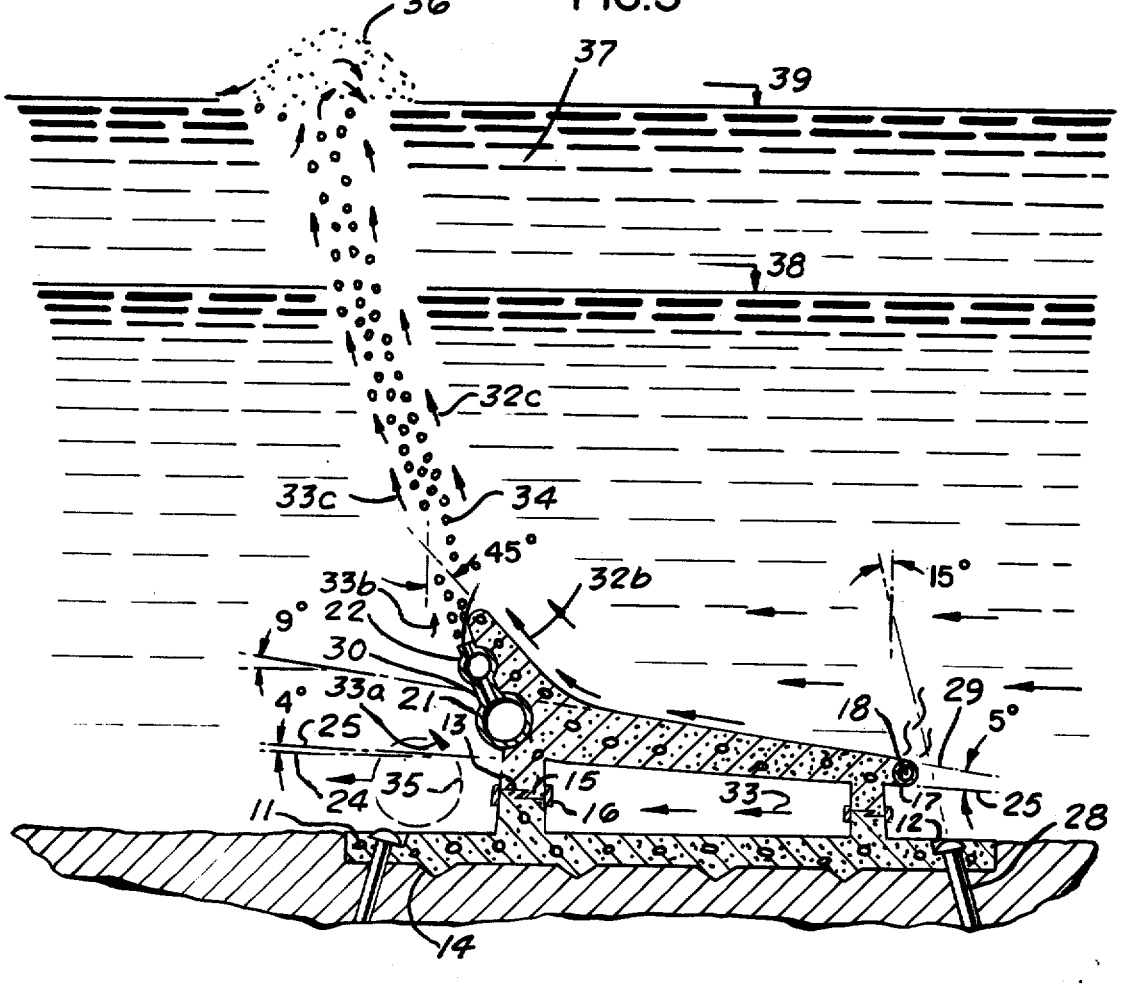
FIG. 3 illustrates as mounted on a river or stream bottom an embodiment in operation such as that of FIG. 1.

As illustrated in FIG. 3, the angle of the anchoring stake 28 in the anchor hole 12 is typically about 15° preferably, and the angle defined by line 29 relative to the lower surface of the wave guide 19 is preferably about 5°. Intermittently spaced along the pipe 21, are located connecting pipes 30 linking pipe 21 to smaller air outlet pipes 22 which have the spaced outlets 31. Water flows at one depth along line 32 and is deflected by the water guide 19 to direction 32a, 32b and 32c.

Water flowing beneath the water guide 19 flows along line 33, and at the far side or far end of the passage or space 23 becomes turbulent and a part thereof flows upwardly along lines 33a, 33b, and 33c. The water is caused to move in the direction of 33c by virtue of the updraft caused by the combined action of the water moving along lines 32b and 32c and the upward movement of bubbles 34, resulting in an updraft turbulence 35. The combined water current flows 32c and 33c and bubbles 34 move upwardly causing a major turbulence 36 at the surface of the water 37. Typically water below level 38 represents the main stream flow of water or the main current of the stream or river, whereas above level 38 below surface 39 there is an additional level which is travelling at possibly the same or greater speed or possibly even in an opposite direction at the time as dependent upon wind direction.

FIG. 2 illustrates a typical elevation plan view of an air-pump plant 40, a series of end to end sections such as that of FIG. 1 extending along line 41 at an angle oblique to the direction of current flow 42 such that the debris moves along in direction 43 of the upstream side of the turbulence 36.

FIG. 4 illustrates an enlarged diagrammatic view of a sludge and debris disposal plant facility 44 shown in miniature in FIG. 2.

FIGS. 4 and 5 each disclose enlarged views of the plant 44 of FIGS. 1 and 2. FIG. 4 discloses an elevation plan view in diagrammatic form, while FIG. 5 illustrates an in-part cross sectional side view of the plant of FIG. 4. In greater particularity, there is the underwater pipe line 45, the reducing tank 46, where air pressure is lowered to the working pressure, the tank 49 with positive air pressure, the collection compartment 47 for collecting drifting objects, the compressor 48, the safety valve 50, the concrete bulkhead 51, and the opposing wall or ground or body 52.

FIG. 6 illustrates another portion of the plant 44, located past the collection compartment 47, and includes typically an appropriate oil removing mechanism such as preferably the newly marketed magnetic oil recovery device (see the publication "Ordnance, July-August 1971," which is hereby incorporated by reference), together with a net or screen 53 to separate all liquid from mechanical admixture — i.e., to separate from the liquid the floating mechanical debris, compartment 54 to separate oil from water, and for pumping out of the oil, net or screen 55 to filter the water, and the flowing clean water 56.

FIG. 7 illustrates an enlarged typical side in-part cross sectional view of the plant 40 of FIG. 2. Typically, there is a tank 57 with positive air pressure, safety valve 58, a compressor 59, a reducing tank 60, pipe line 61, underwater pipe line 61', and pump 62 for pumping out water from the pipe line and also serving for after switching over, to give chemicals or to pump chemicals into the pipe line 18 of FIGS. 1 and 3.

FIG. 8 illustrates a simple air valve shown in-part as a mounted or integral structure with a pipe line locatable under the water for the present invention, typically illustrating for example the cover 63, the lever 64 with spring, the air valve body 65, the underwater pipe line 61', and the gasket 65'.

FIG. 9 illustrates another embodiment preferably for use where water level is minimal or very low, the air pipe being installed on a special foundation made of concrete. Typically there is an air valve 66 for emitting air in controlled amount, the air pipe line 67, the connecting pipe 68, the air pipe line 69, the foundation 70, the hole 71 to facilitate the elimination and avoidance of silt forming in the general zone, and the spike or stopper 72.

It should be noted that with regard to the FIG. 1 and the FIG. 3 embodiment, the movement of water 33 through the space 23 avoids the collection of silt, sand, or other matter within this area as well as the fact that it, as noted previously, brings about a turbulence on the downstream side, a part of which water from the turbulence is drawn upwardly to form a part of the turbulence 33c.

It should be apparent to those skilled in the art that the presently illustrated embodiments are intended solely to illustrate the heart and nature of the invention and that modifications and variations may be made, and substitution of equivalents may be made, as would be apparent to those having reasonable skill in this art.

I claim:

1. An improved anti-pollution system for a waterway having a normal direction of flow and carrying a certain amount of pollutants in said flow comprising in combination:
    a rigid, elongated member having a weight substantially greater than the water it displaced disposed across the bottom of said waterway,
    a conduit carried by said member along its longitudinal length,
    mounting means to securely affix said member to said bottom surface at an angle from about 15° to 75° to said direction of flow,
    a plurality of air escapement perforations spaced along the length of said conduit,
    said member having an upper surface having an upstream edge and a downstream edge and said upper surface angles upwardly from said upstream edge to said downstream edge so as to deflect water moving in said normal direction of flow in an upward direction,
    pump means providing air to said conduit at a pressure sufficient to cause a rising plane of turbulence from said conduit to the surface of the waterway where a line of turbulence is formed having an upstream end and a downstream end and of sufficient pressure to cause pollutants in said flow to move toward said downstream end, and
    means for collecting said pollutants at said downstream end.

2. The invention of claim 1 wherein said member includes a downstream surface extending downwardly from said upper edge and said perforations of said conduit are disposed in said downstream surface immediately below said downstream edge.

3. The invention of claim 1 wherein said member includes a base member and means supporting said upper surface in spaced relationship to said base member permitting water to flow therebetween.

4. The invention of claim 1 in which said member means includes an arcuate surface angling upwardly from about a horizontal plane in an upstream direction and terminating in an upright plane in a downstream direction adjacent said perforations such that portions of said downstream direction-moving waterway water coming into contact with and in the vicinity of said surface is directable upwardly toward a water surface of said waterway water.

5. The invention of claim 1, in which said mounting means includes a supporting spacer-base means securable of said conduit means to a waterway bottom and spacing said conduit means from a waterway bottom by a predetermined spaced amount sufficient for a portion of deep waterway water to flow between said conduit means and a waterway bottom to which the spacer-base is securable.

6. The invention of claim 5, in which said conduit means includes a plurality of interconnectable corrosion-resistant pipes interconnectable in series with one another.

7. The invention of claim 6, in which said interconnectable pipes are detachably interconnectable to one another for series flow therethrough and detachably mountable on said supporting spacer-base means.

8. The invention of claim 1 in which said collection means includes a separate buoyant debris screen collector and in a further downstream flow an oil-collecting means.

* * * * *